United States Patent
Yoshimura et al.

(10) Patent No.: US 7,545,551 B2
(45) Date of Patent: Jun. 9, 2009

(54) ALL-SOLID-STATE REFLECTION-CONTROLLABLE ELECTROCHROMIC DEVICE AND OPTICAL SWITCHABLE COMPONENT USING IT

(75) Inventors: Kazuki Yoshimura, Aichi (JP); Kazuki Tajima, Aichi (JP); Yasusei Yamada, Aichi (JP); Hirosumi Ogawa, Yokosuka (JP); Kinya Kumazawa, Yokosuka (JP); Jun Okada, Tokyo (JP)

(73) Assignees: National Institute of Advanced Industrial Science and Technology, Tokyo (JP); Nissan Motor Co., Ltd., Yokohama-shi (JP)

( * ) Notice: Subject to any disclaimer, the term of this patent is extended or adjusted under 35 U.S.C. 154(b) by 119 days.

(21) Appl. No.: 11/519,016

(22) Filed: Sep. 12, 2006

(65) Prior Publication Data

US 2007/0076288 A1 Apr. 5, 2007

(30) Foreign Application Priority Data

Sep. 12, 2005 (JP) .............................. 2005-264482
Aug. 23, 2006 (JP) .............................. 2006-227209

(51) Int. Cl.
*G02F 1/153* (2006.01)
*G02F 1/15* (2006.01)
(52) U.S. Cl. ...................... 359/273; 359/265; 359/267; 359/274
(58) Field of Classification Search ................ 359/245, 359/265, 267, 269, 270, 273–275, 321; 427/523, 427/524, 529; 428/432, 704; 219/203, 209, 219/219
See application file for complete search history.

(56) References Cited

U.S. PATENT DOCUMENTS

| | | | | |
|---|---|---|---|---|
| 4,938,571 A | * | 7/1990 | Cogan et al. | 359/275 |
| 5,019,420 A | * | 5/1991 | Rauh | 427/126.3 |
| 5,069,535 A | * | 12/1991 | Baucke et al. | 359/273 |
| 5,130,842 A | * | 7/1992 | Gauthier et al. | 359/265 |
| 5,215,821 A | * | 6/1993 | Ho | 428/432 |
| 6,094,292 A | * | 7/2000 | Goldner et al. | 359/265 |
| 6,452,711 B1 | * | 9/2002 | Heuer et al. | 359/265 |
| 6,647,166 B2 | | 11/2003 | Richardson | 385/16 |

(Continued)

FOREIGN PATENT DOCUMENTS

JP 2000-204862 7/2000

(Continued)

*Primary Examiner*—Loha Ben
(74) *Attorney, Agent, or Firm*—Oblon, Spivak, McClelland, Maier & Neustadt, P.C.

(57) ABSTRACT

The present invention provides an all-solid-state reflection-controllable electrochromic device and a reflection-controllable member using that device, and the present invention relates to the all-solid-state reflection-controllable electrochromic device, which is a reflection-controllable device in which a multilayer thin film is formed on a transparent base material, wherein, at least a transparent conductive film layer, an ion storage layer, a solid electrolyte layer, a catalyst layer and a reflection-controllable layer using a magnesium-nickel based alloy thin film are formed on the base material; and, a reflection-controllable member incorporating this reflection-controllable electrochromic device, and it is possible to provide a reflection-controllable electrochromic device, having a novel multilayer structure with high transmissivity when transparent and capable of switching in a short period of time over a large surface area, and a reflection-controllable member incorporating this device.

16 Claims, 7 Drawing Sheets

60 REFLECTION-CONTROLLABLE LAYER
50 CATALYST LAYER
40 SOLID ELECTROLYTE LAYER
30 ION STORAGE LAYER
20 TRANSPARENT CONDUCTIVE FILM
10 TRANSPARENT BASE MATERIAL

| U.S. PATENT DOCUMENTS | | | | | FOREIGN PATENT DOCUMENTS | | |
|---|---|---|---|---|---|---|---|
| 7,262,899 | B2 * | 8/2007 | Bigman | 359/269 | JP | 2003-335553 | 11/2003 |
| 7,352,500 | B2 * | 4/2008 | Jagt et al. | 359/265 | JP | 2005-274630 | 10/2005 |
| 7,362,490 | B2 * | 4/2008 | Park | 359/265 | | | |
| 2007/0058237 | A1 * | 3/2007 | Appelfeller et al. | 359/267 | * cited by examiner | | |

80 TRANSPARENT BASE MATERIAL
70 TRANSPARENT CONDUCTIVE FILM
60 REFLECTION-CONTROLLABLE LAYER
50 CATALYST LAYER
40 SOLID ELECTROLYTE LAYER
30 ION STORAGE LAYER
20 TRANSPARENT CONDUCTIVE FILM
10 TRANSPARENT BASE MATERIAL

ALL-SOLID-STATE REFLECTION-CONTROLLABLE ELECTROCHROMIC DEVICE AND OPTICAL SWITCHABLE COMPONENT USING IT

BACKGROUND OF THE INVENTION

1. Field of the Invention

The present invention relates to an all-solid-state reflection-controllable electrochromic device using a magnesium-nickel based alloy thin film, and more particularly, to a novel all-solid-state reflection-controllable electrochromic device capable of electrically controlling the transmission of sunlight entering through window glass by reversibly and electrically changing the glass surface from a mirror state to a transparent state, a production process thereof, and a reflection-controllable member.

The present invention relates to an electrochromic device which has high transmittance when transparent and is capable of switching the state of the glass surface in a short period of time over a large surface area by employing a specific multilayer structure which uses a magnesium-nickel alloy thin film for a reflection-controllable layer. The present invention provides a novel all-solid-state reflection-controllable electrochromic device preferably used in window glass of buildings and automobiles to reduce the sensation of heat in a building or automobile by controlling the transmission of sunlight, for example, a reflection-controllable member incorporating said electrochromic device, and new technologies and new products relating to said reflection-controllable member.

2. Description of the Related Art

Generally, in buildings, window glass typically serves as a large passageway for the transfer of heat. For example, the proportion of heat lost through windows when heating a building during the winter may reach about 48%, while the proportion of heat that enters through windows when cooling during the summer may reach as much as about 71%. The same phenomenon applies to automobiles in which window glass also serves as a large passageway for the transfer of heat. In automobiles, the ratio of window glass to interior space is even larger than in buildings, leaving little room for persons inside to avoid the radiant heat. Consequently, the interior of an automobile located in a hot weather environment reaches an extremely high temperature.

In examples of measuring automobile interior temperatures in a summer environment in Japan, the air temperature inside a parked automobile has been found to reach nearly 70° C. In addition, with respect to the temperatures of interior parts and materials inside an automobile, the top of the instrument panel may reach nearly 100° C., while the roof may reach nearly 70° C. It goes without saying that riding in an automobile under such conditions is extremely uncomfortable. In addition, since the temperature of interior parts and materials does not readily lower even if the interior is ventilated or the air-conditioner is used, passengers continue to be radiated with radiant heat for a long period of time, thereby significantly decreasing the level of comfort within the vehicle.

Light-controllable glass has been developed as a technology for solving these problems which is capable of controlling the transfer of light and heat. There are several types of light-control systems used in light-controllable glass. Examples of light-controllable devices include: 1) electrochromic devices using a material which reversibly changes optical transmission by applying a current or voltage, 2) thermochromic devices using a material which changes transmission according to temperature, and 3) gas chromic devices using a material which changes transmission by controlling an atmospheric gas.

Among these, electrochromic devices are able to electrically control the transmission of light and heat. Consequently, electrochromic devices enable the transmission of light and heat to be set as desired, and are extremely suitable as light-controllable materials applied to building and automobile glass. Moreover, since these devices maintain the same optical characteristics when a current or voltage is not applied, the energy required to maintain a constant state of the devices can be reduced.

Although some compositions of electrochromic devices are in a liquid state, it is necessary to prevent leakage of liquid in such cases. Since buildings and automobiles are premised on long-term use, although it is possible to prevent leakage of liquid for a long period of time, this leads to higher costs. Consequently, all of the materials which compose electrochromic devices suitable for building and automobile glass are preferably solids in the manner of tungsten oxide.

Tungsten oxide and others known as electrochromic devices are based on the principle of controlling light by absorbing light with a light-controllable material. Namely, these devices control the entrance of heat in the form of light into an interior by absorbing light. However, in the case of employing a light-controllable material having this type of light-control principle, there is the problem of the light-controllable material retaining heat as a result of absorbing light, that heat being re-radiated into the interior, and that heat ending up penetrating into a light-controllable glass.

A technique for solving this problem has been proposed in which light is controlled by reflecting light instead of absorbing light. In other words, the entrance of heat into an interior caused by absorption of heat by a light-controllable material can be prevented by using a reflection-controllable material which reversibly changes between a mirrored state and a transparent state.

As an example of a reflection-controllable electrochromic devices having this characteristic, an electrochromic device having a reflection-controllable layers composed of an alloy of a rare earth metal and magnesium and a hydride thereof, a proton-conductive, transparent, oxidation protective layer, an anhydrous solid electrolyte layer and an ion storage layer being laminated therein (see Japanese Patent Application Laid-open No. 2000-204862).

The reflection-controllable layer has a function which controls optical reflectance of the electrochromic device, and reflectance changes due to the transfer of protons. The oxidation protective layer is composed of a compound having proton conductivity, examples of which include oxides such as niobium oxide, vanadium oxide and tantalum oxide, and fluorides such as magnesium fluoride and lead fluoride, and prevents oxidation of the reflection-controllable layer.

The ion storage layer accumulates protons used to control reflectivity. When a voltage is applied to a light-controllable glass, protons move from the ion storage layer into the reflection-controllable layer through solid electrolyte and oxidation protective layers, resulting in a change in the reflectance of the reflection-controllable layer. When a voltage is applied in the opposite direction thereto, protons are released from the reflection-controllable layer, and reflectivity of the reflection-controllable layer returns to its original level. In this device, however, since expensive rare earth metal is used for the reflection-controllable layer, applications to large surface areas are difficult from the viewpoint of cost.

As an example of another reflection-controllable device using a more practical material for the reflection-controllable layer, a device in which Mg$_2$Ni is laminated for the reflection-controllable layer while palladium or platinum is laminated as a catalyst layer has been proposed (see U.S. Pat. No. 6,647,166). However, this type of material was unable to be used practically due to the low transmittance when the device is transparent.

A magnesium-nickel alloy thin film developed by some of the inventors of the present invention (see Japanese Patent Application Laid-open No. 2003-335553) is of the gas chromic type using hydrogen gas, and the visible light transmittance thereof is about 50%, which is considerably better than the level of 20% of previously reported Mg$_2$Ni, and is close to practical application. As an example of an all-solid-state light-controllable mirror device using this magnesium-nickel alloy thin film, an all-solid-state light-controllable mirror optical switch has been proposed comprising an ion storage layer, a solid electrolyte layer and the magnesium-nickel alloy described in the above-mentioned Japanese Patent Application laminated in the form of a reflection-controllable device (see Japanese Patent Application Laid-open No. 2005-274630).

However, although the switching time of this device has a short when it changes from a reflecting state to a transparent state in the vicinity of an electrode, it has the problem of that the switching time becomes considerably longer as the distance increases from the electrode, thereby preventing its use in windows and so forth. Consequently, there has been a strong desire in the relevant technical field for the development of an all-solid-state reflection-controllable electrochromic device having high transmittance when transparent, and capable of switching over a large surface area.

SUMMARY OF THE INVENTION

With the foregoing in view, as a result of conducting extensive studies with the aim of developing an electrochromic device capable of fundamentally solve these problems, the inventors of the present invention succeeded in developing an all-solid-state reflection-controllable electrochromic device using a magnesium-nickel based alloy thin film, thereby leading to completion of the present invention.

An object of the present invention is to provide an all-solid-state reflection-controllable electrochromic device which uses a magnesium-nickel alloy thin film having high transmittance when transparent for the reflection-controllable layer, is composed of a multilayer structure in which an ion storage layer, a solid electrolyte layer and a catalyst layer are laminated so that the reflection-controllable layer becomes transparent from the side of the solid catalyst layer, and is capable of switching in a short period of time over a large range, a reflection-controllable material and a reflection-controllable member.

In order to solve the above-mentioned problems, the present invention is composed of the following technical means.

(1) An all-solid-state reflection-controllable electrochromic device, characterized by composed of a reflection-controllable device having a multilayer thin film formed on a transparent base material, the multilayer thin film comprising, at least a transparent conductive film layer, an ion storage layer, a solid electrolyte layer, a catalyst layer and a reflection-controllable layer using a magnesium-nickel based alloy thin film formed on the base material.

(2) The all-solid-state reflection-controllable electrochromic device according to (1) above, wherein a reflection-controllable action is exhibited by applying a voltage and/or applying a current between the transparent conductive film layer and the reflection-controllable layer.

(3) The all-solid-state reflection-controllable electrochromic device according to (1) above, wherein a transition metal oxide thin film is formed as the ion storage layer on the transparent base material coated with a transparent conductive film.

(4) The all-solid-stage reflection-controllable electrochromic device according to (1) above, wherein a transparent oxide thin film is formed on the ion storage layer as the solid electrolyte layer.

(5) The all-solid-state reflection-controllable electrochromic device according to (4) above, wherein the transparent oxide which constitutes the solid electrolyte layer comprises tantalum oxide (Ta$_2$O$_5$).

(6) The all-solid-state reflection-controllable electrochromic device according to (5) above, wherein the density of the solid electrolyte layer is 2.8 to 4.3 g/cm$^3$.

(7) The all-solid-state reflection-controllable electrochromic device according to (1) above, wherein a layer containing palladium, gold, silver or an alloy thereof is formed on the solid electrolyte layer as the catalyst layer.

(8) The all-solid-state reflection-controllable electrochromic device according to (1) above, wherein the magnesium-nickel based alloy thin film is formed on the catalyst layer as the reflection-controllable layer.

(9) The all-solid-state reflection-controllable electrochromic device according to (1) above, wherein the magnesium-nickel based alloy is MgNi$_x$ (where $0.1 \leqq x \leqq 0.5$).

(10) The all-solid-state reflection-controllable electrochromic device according to (1) above, wherein the ion storage layer or the reflection-controllable layer is hydrogenated during production process thereof.

(11) The all-solid-state reflection-controllable electrochromic device according to (1) above, wherein the device has the transparent conductive film layer between the transparent base material and the ion storage layer.

(12) The all-solid-state reflection-controllable electrochromic device according to (1) above, wherein the device has the transparent conductive film layer to the outside of the reflection-controllable layer as an arbitrary configuration thereof.

(13) The all-solid-state reflection-controllable electrochromic device according to (1) or (12) above, wherein the surface resistance of the transparent conductive film layer is 100Ω/□ or less.

(14) The all-solid-state reflection-controllable electrochromic device according to (1) or (12) above, wherein the transparent conductive film layer contains at least one type of metal thin film, oxide or organic compound having light transmission of 70% or more.

(15) A production process of an all-solid-state reflection-controllable electrochromic device comprising the step of forming a multilayer thin film on a transparent base material, and making a reflection-controllable layer transparent from the side closer to a solid electrolyte by suppressing proton diffusion of the solid electrolyte layer.

(16) A reflection-controllable member, comprising the all-solid-state reflection-controllable electrochromic device according to any of (1) to (14) above incorporated therein.

(17) The reflection-controllable member according to (16) above, wherein the reflection-controllable member is glass.

The following provides a more detailed explanation of the present invention.

The present invention relates to a solid-state electrochromic device exhibiting a reflection-controllable action by applying a voltage or a current, and this electrochromic device is composed of a laminated structure comprising a transparent conductive film, an ion storage layer, a solid electrolyte layer, a catalyst layer and a reflection-controllable layer using a magnesium-nickel based alloy thin film on a transparent base material.

Moreover, the present invention is characterized by laminating an ion storage layer, a solid electrolyte layer and a catalyst layer so that electrons in a reflection-controllable layer diffuse faster than the diffusion of protons injected into the reflection-controllable layer, and as a result, is able to switch between a mirrored state and a transparent state at a speed much faster than a solid-state reflection-controllable electrochromic device of the prior art.

The thin films which constitute each of these layers can be produced by, for example, magnetron sputtering method, vacuum deposition method, electron beam deposition method, chemical vapor deposition (CVD) method, plating method and the like. However, the method used to produce the thin films is not limited to these methods. Deposition of each of these layers is carried out preferably by using, for example, the above-mentioned magnetron sputtering system.

Next, an explanation of the specific structure of an all-solid-state reflection-controllable electrochromic device of the present invention is provided with reference to the drawings. Furthermore, in the following explanation, the all-solid-state reflection-controllable electrochromic device is simply referred to as an electrochromic device. FIG. 1 is a cross-sectional schematic drawing showing a layer structure of an electrochromic device of the present invention.

In FIG. 1, an electrochromic device is composed of a laminated structure comprising a transparent base material 10 (also be described as a "base material"), a transparent conductive film 20, an ion storage layer 30, a solid electrolyte layer 40, a catalyst layer 50, and a reflection-controllable layer 60 using a magnesium-nickel based alloy thin film (also be described as a "reflection-controllable layer"). Furthermore, FIG. 1 is a simple schematic drawing, and the thickness and size of the reflection-controllable plate of the present invention is not limited to the aspect shown in the drawing.

In FIG. 1, although the transparent conductive layer 20, ion storage layer 30, solid electrolyte layer 40, catalyst layer 50 and reflection-controllable layer 60 are laminated on the base material 10, other layers can also be laminated. For example, a transparent conductive film 70 can also be suitably further laminated on reflection-controllable layer 60.

FIG. 2 is a cross-sectional schematic drawing of an electrochromic device in which the transparent conductive film 70 is formed on the reflection-controllable layer 60. Depending on the case, a base material 80 may also be formed on the transparent conductive film 70 on the reflection-controllable layer 60 (FIG. 3).

Furthermore, in the present invention, the term "on" used in the explanation of "on the catalyst layer" and so forth is used in the sense of clearly indicating the direction of a laminated layer, and does not necessarily refer to being arranged while being in contact. For example, in the case of "a catalyst layer formed on a solid electrolyte layer", this includes the case of the solid electrolyte layer and the catalyst layer being arranged in contact with each other, and the case of the solid electrolyte layer and the catalyst layer being arranged with another layer interposed there between.

Although FIGS. 1 to 3 show layer structures of an electrochromic device of the present invention, the technical scope of the present invention is not limited thereby. In the present invention, there may be an aspect thereof in which, for example, two solid electrolyte layers are arranged. In addition, in the present invention, a structure is preferably employed in which each layer such as the transparent conductive layer 20, ion storage layer 30, solid electrolyte layer 40, catalyst layer 50 and reflection-controllable layer 60 are sandwiched between two base materials.

Since a reflection-controllable layer is susceptible to oxidation deterioration by water and oxygen, the arrangement of base materials on both sides reduces penetration by water and oxygen. A layer structure in which an electrochromic device, sandwiched between base materials 10 comprised of resin sheets, is sandwiched between a pair of glass plates is preferable for more effectively preventing penetration of water and oxygen into the device.

FIG. 4 shows a cross-sectional schematic drawing of a reflection-controllable plate in which an electrochromic device is sandwiched between a pair of glass plates 100. A laminated glass intermediate film 90 made of polyvinyl butyral and so forth can be interposed between the glass plates 100 and the electrochromic device as necessary.

An electrochromic device of the present invention is preferably applied to a light-controllable member such as a construction member or automobile part on the basis of the function thereof. In the case of a construction member, window glass is a typical applicable member thereof. In the case of an automobile part, examples of applicable parts include window glass, sun roofs, exterior paneling and interior parts, and an electrochromic device of the present invention is preferably applied to a window glass or sun roof. The use of an electrochromic device of the present invention makes it possible to the amount of transmitted radiant energy, and maintain a comfortable interior space.

Continuing, an explanation of each constituent member of an electrochromic device of the present invention is provided. There are no particular limitations on the material and shape of the base material provided it functions as a base material of an electrochromic device. The base material not only functions as the foundation for forming the transparent conductive layer, ion storage layer, solid electrolyte layer, catalyst layer and reflection-controllable layer, but also preferably functions as a barrier for controlling the intrusion of water and oxygen into the film.

Specific examples of base materials include glass and resin sheet. In the case of using a resin sheet, a material which generates a small amount of outgas is preferable from the viewpoint of reduced pressure since deposition of each layer is carried out under reduced pressure conditions. In addition, although the resin sheet is preferably colorless and transparent, a colored resin sheet can be used as necessary.

From the viewpoints of price, transparency, heat resistance and so forth, a material such as polyethylene terephthalate (PET), polyethylene naphthalate (PEN), Nylon or acrylic is preferable for the resin to be used. In the case of using two base materials, there are no particular limitations on the combination thereof.

For example, a base material can be used which suitably combines materials such as glass and a resin sheet. These include combinations of glass and glass, glass and resin sheet and resin sheet and resin sheet. As shown in FIG. 4, in the case of further sandwiching an electrochromic device between glass plates, the base material is preferable a resin sheet. The work process for the transparent conductive film on base material 10 can be simplified by using a base material on which the transparent conductive film has been formed in advance.

The transparent conductive film 20 is composed of an electrically conductive material, and is used to control reflectance by applying a voltage and/or current to an electrochromic device. There are no particular limitations on the material of the transparent conductive film, and a known material can be used.

Examples of materials to be used include metal thin films such as gold, silver, copper, aluminum, nickel, tungsten, platinum, palladium, tin, titanium, zinc and alloys thereof, and oxides such as indium tin oxide (ITO), fluorine tin oxide (FTO), antimony tin oxide (ATO), tin oxide and zinc oxide. Organic polymer materials can also be applied. Newly developed materials can also be used for the transparent conductive film.

In the case of using two base materials and transparent conductive films are formed on each, the transparent conductive films can be the same or different. The surface resistance of transparent conductive film 70 is involved in the response of the electrochromic device, and the value thereof is preferably low. More specifically, the surface resistance of the transparent conductive film is preferably, for example, 100Ω/□ or less. In addition, the transparent conductive film preferably has high visible light transmittance in consideration of application of the electrochromic device to window glass.

More specifically, the visible light transmission of the transparent conductive film is preferably 70% or more. In the case of installing this transparent conductive film, it can be coated over the entire surfaces of the base material and reflection-controllable layer, and can be patterned on one or both. The advantage of using a patterned electrode is that, since there are portions in the device where there is no electrode, the transmission of the device can be increased at those portions.

The ion storage layer 30 is a layer capable of reversibly storing and removing protons required to switch the reflection-controllable layer between a transparent state and mirrored state. Moreover, an ion storage layer can be used which is colored when protons are removed as necessary, it preferably is made of a material which has the characteristic of being colorless and transparent. A transition metal oxide is a preferable example of a composite material. Examples of transition metal oxides include tungsten oxide, molybdenum oxide, niobium oxide and vanadium oxide.

Among these transition metal oxides, tungsten oxide is preferable since it has high stability ($10^6$ cycles or more) during use as a composite material of an electrochromic device. However, the material of the transition metal oxide is not limited thereto, but rather similar materials can be used provided they have similar effects. Although there are no particular limitations on the thickness of the storage layer 30, it is preferably within the range of 250 to 2000 nm.

The solid electrolyte layer 40 uses a material having the characteristic of allowing protons to move easily as a result of applying a voltage, and since it is a solid, can be used stably for a long period of time. A transparent oxide is a preferable example of a preferable composite material. In addition, the electrolyte is preferably anhydrous since the presence of moisture can cause oxidation deterioration of the reflection-controllable layer containing magnesium and nickel.

Specific examples of constituent components of the solid electrolyte layer 40 include tantalum oxide and zirconium oxide. However, the constituent components are not limited thereto, but rather similar components can be used provided they have similar effects. In addition, although there are no particular limitations on the thickness and density of the solid electrolyte layer 40, they are preferably within the ranges of 25 to 1000 nm and 2.8 to 4.3 g/cm$^3$, respectively.

The catalyst layer 50 on which the reflection-controllable layer is formed exhibits the function of a passageway for the supply and release of protons to and from the reflection-controllable layer. Components of the catalyst layer which enable the catalyst layer to improve the speeds of supply and release of protons and enhance switching between a mirrored state and a transparent state are preferably palladium, platinum and palladium alloy due to their high proton permeation capacity. Preferable examples of palladium alloys used include palladium-silver alloy and palladium-platina alloy. Characteristics can be improved by containing other components in the palladium alloy depending on the case.

In addition, although a certain degree of impurities are permitted to be contained since the palladium alloy is an alloy, the amount of impurities contained is preferably low. Although there are no particular limitations on the thickness of the catalyst layer 50, it is preferably within the range of 0.5 to 10 nm. If the catalyst layer is excessively thin, it is not able to adequately demonstrate the function of a catalyst. Conversely, if the catalyst layer is excessively thick, the light transmittance of the catalyst layer decreases. In addition, if a certain degree of thickness of the catalyst layer is exceeded, the function thereof as a catalyst no longer improves even though the thickness of the catalyst layer is increased.

The reflection-controllable layer 60 is a material which changes between a transparent state and mirror state as a result of the uptake and release of hydrogen and protons, and exhibits a reflection-controllable function. The reflection-controllable layer is composed of an alloy containing magnesium and nickel. The reflection-controllable layer is preferably composed of a magnesium-nickel alloy in which the ratio between nickel and magnesium is within the range of 0.1 to 0.5 parts nickel to 1 part magnesium. In particular, a magnesium-nickel alloy in which this range is from 0.1 to 0.3 tends to exhibit higher transmissivity when it becomes transparent as a result of hydrogen uptake. MgNi$_{0.5}$ is preferable from the viewpoint of raw material cost.

Depending on the case, it is possible to improve characteristics of the devices by containing other components in the magnesium-nickel based alloy. In the present invention, even if components other than magnesium and nickel are contained, they are included in the concept of a magnesium-nickel based alloy of the present invention provided the characteristics of magnesium-nickel based alloy are retained. Even in cases in which the characteristics of the magnesium-nickel based alloy decrease, other components are included in the concept of a magnesium-nickel based alloy provided the crystal structure of the magnesium-nickel based alloy is partially retained.

In addition, although a certain degree of impurities are permitted to be contained since the magnesium-nickel based alloy is an alloy, the amount of impurities contained is preferably low. The thickness of the reflection-controllable layer 60 is preferably about 20 to 200 nm. If the reflection-controllable layer is excessively thin, the light reflectivity in the mirrored state decreases, and adequate reflection characteristics are not exhibited. Conversely, if the reflection-controllable layer is excessively thick, light transmissivity in the transparent state decreases. Although different specifications are required depending on the application, accommodations can be made by controlling film thickness.

An electrochromic device can be obtained by providing a proton accumulating layer and electrolyte layer on a transparent base material provided with a transparent conductive film, and then forming a catalyst layer, reflection-controllable layer and transparent conductive film thereon. The order by which these layers are produced can be such that a proton accumulating layer and electrolyte layer are provided on a base material provided with a transparent conductive film followed by forming a catalyst layer, reflection-controllable layer and transparent conductive film thereon, or conversely, a reflection-controllable layer and catalyst layer are provided on a base material provided with a transparent conductive film followed by providing an electrolyte layer and proton accumulating layer, and more preferably, a transparent conductive film.

As shown in FIG. 4, examples of materials used for the glass and resin sheet used in the case of sandwiching an electrochromic device between two glass plates or resin sheets are indicated below. There are no particular limitations on the glass material, and ordinarily used glass can be applied. Although colorless glass is used for the glass, colored glass is used as necessary.

Specific examples of glass include clear glass, green glass, bronze glass, gray glass, blue glass, UV-blocking insulating glass, heat-absorbing glass and reinforced glass. These types of glass can be combined as necessary.

There are no particular limitations on the resin sheet material, and a transparent material generating only a small amount of outgas is preferable. In the case of producing each layer of an electrochromic device using a resin sheet, since deposition is frequently carried out under reduced pressure conditions, the use of a resin sheet generating only a small amount of outgas makes it easier to maintain the reduced pressure.

Specific examples of resins include various types of aliphatic polyamides typically represented by Nylon, polyesters such as polyethylene terephthalate, polyphenyl sulfide (PPS), polyether ether ketone and polypropylene, and resin sheets composed of these resins are preferable in terms of workability, economy, market availability and recycling.

Among these resins, polypropylene and polyesters are preferable, with examples of polyesters including polyethylene terephthalate (PET), polybutylene terephthalate (PBT), polyethylene naphthalate (PEN), polybutylene naphthalate (PBN), polyethylene isophthalate (PEI), polybutylene isophthalate (PBI) and poly-ε-caprolactone (PCL), as well as resins in which the ethylene glycol component of PET is substituted with a different glycol component (for example, polyhexamethylene terephthalate (PHT)), or resins in which the terephthalic acid component is substituted with a different dibasic acid component (for example, polyhexamethylene isophthalate (PHI) and polyhexamethylene naphthalate (PHN)).

In consideration of such factors as cost, transparency and heat resistance, these are preferably composed of polyethylene terephthalate (PET), polyethylene naphthalate (PEN), Nylon or acrylic. There are no particular limitations on the size and thickness of each layer composing the electrochromic device. These can be determined with reference to known structures, and are suitably adjusted corresponding to the application and required level of performance. For example, if the electrochromic device is used in an automobile windshield, the size of the transparent base material is determined according to the design of the vehicle. In addition, thickness is also determined in consideration of such factors as transmittance and strength of the light-control material.

The operation of light-control of an all-solid-state reflection-controllable electrochromic device is carried out by applying a voltage and applying a current between the ion storage layer and the reflection-controllable layer. Namely, if a positive voltage is applied to the transparent conductive film layer 20 and a negative voltage is applied to the reflection-controllable layer 60 when the electrochromic device is in a mirrored state, protons stored in the ion storage layer 30 diffuse into the reflection-controllable layer 60 through the solid electrolyte layer 40 and the catalyst layer 50, thereby causing hydrogenation and changing the reflection characteristics thereof from a mirror state to a transparent state.

At this time, the catalyst layer 50 has a function which promotes the transfer of protons between the solid electrolyte layer 40 and the reflection-controllable layer 60, and adequate switching speed is secured in the reflection-controllable layer 60 by this catalyst layer 50. Conversely, when the electrochromic device is in a transparent state, if a negative voltage is applied to the ion storage layer 30 and a positive voltage is applied to the reflection-controllable layer 60, hydrides within the reflection-controllable layer 60 are dehydrogenated, and the reflection characteristics thereof return to a mirrored state from the transparent state. The released hydrogen returns in proton form to the ion storage layer 30 by passing through the catalyst layer 50 and the solid electrolyte layer 40, and is stored therein.

The diffusion speed of the protons in the solid electrolyte layer has a considerable influence on the light-control characteristics of this device. As shown in FIG. 5($a$), a rapid diffusion speed results in a large number of protons being injected into the reflection-controllable layer through the catalyst layer. These protons then bond with electrons supplied from the electrode to which a negative potential is applied, transforming them into hydrides starting in the vicinity of the electrode and resulting in transparency.

Since these hydrides are insulating, once they are formed, diffusion of electrons from the electrode slows considerably. Thus, in this device, although transparency occurs rapidly starting in the vicinity of the electrode, an extremely long period of time is required for the transparent portion to spread throughout the device. This type of device (Type 1) is suitable for controlling light over small areas such as light switches, and is equivalent to the all-solid-state light-controllable mirror optical switch described in the above-mentioned Japanese Patent Application Laid-open No. 2005-274630.

In addition, in this type of device, as shown in FIG. 5($b$), since an insulating layer ends up being formed between the transparent conductive film layer and the reflection-controllable layer even if a transparent conductive film is provided on the reflection-controllable layer, switching speed is again slow. In contrast, as shown in FIG. 5($c$), a slow proton diffusion speed results in rapid diffusion of electrons, thereby causing the reflection-controllable layer to become transparent starting from the side of the catalyst layer. In this case, since the portion on the reflection-controllable layer is in a metallic state, electrons are able to diffuse easily, thereby resulting in transparency over a wide area. This type of device (Type 2) is suitable for application to large-area windows, and is defined in the present invention.

The proton diffusion speed in the solid electrolyte layer is greatly dependent on moisture contained in the solid electrolyte layer. Thus, if the solid electrolyte layer is deposited such that a large amount of moisture is contained therein, the device becomes a Type 1 device, while if it is deposited such that there is very little moisture contained therein, it becomes a Type 2 device. In addition, in order to control light rapidly and over a wide range, it is necessary that the diffusion of protons and electrons in the thin film be balanced, and an important parameter which influences this property was found to be the density of the tantalum oxide thin film.

In the case the density of tantalum oxide is less than 2.8 g/cm$^3$, although protons move easily and the Mg—Ni layer becomes transparent, since the electrons move slowly, the hydrogenated Mg—Ni layer is not dehydrogenated. Conversely, if the density of tantalum oxide is greater than 4.3 g/cm$^3$, although electrons move rapidly, protons which have entered the tantalum oxide layer were found to not reach the Mg—Ni layer. Thus, it is important that the density of the tantalum oxide layer be within the range of 2.8 to 4.3 g/cm$^3$.

Although conventional materials using a magnesium-nickel alloy as a reflection-controllable device have a rapid switching time with respect to changing from a reflecting state to a transparent state in close proximity to the electrode, there is the problem of the switching speed decreasing considerably as the distance from the electrode increases, thus making it difficult to use this device in windows and the like. In contrast, by using a specific multilayer structure using a magnesium-nickel alloy thin film for the reflection-controllable layer as in the present invention, it is possible to provide a reflection-controllable electrochromic device having a multilayer structure which has high transmission when transparent and enables rapid switching over a large surface area, and a reflection-controllable member incorporating said device. Thus, the present invention is useful for providing a practical, novel an all-solid-state reflection-controllable electrochromic material and reflection-controllable member.

The following effects are exhibited by the present invention.

(1) An all-solid-state reflection-controllable electrochromic device using a magnesium-nickel alloy thin film material having superior reflection-controllable characteristics.

(2) A multilayer structure of an all-solid-state reflection-controllable electrochromic device can be provided which is capable of controlling the amount of transmitted radiant energy of sunlight and maintain a comfortable interior space.

(3) A reflection-controllable member can be provided such as glass which incorporates the above-mentioned all-solid-state reflection-controllable electrochromic device.

(4) A novel all-solid-state reflection-controllable electrochromic device can be provided which is capable of electrically controlling the transmission of sunlight entering through window glass by electrically and reversibly changing the glass surface from a mirrored state to a transparent state.

(5) A reflection-controllable electrochromic device and reflection-controllable member can be provided which can be used particularly preferably for controlling the light of window glass and the like by enabling switching from a reflecting state to a transparent state in a short period of time and over a large surface area.

DESCRIPTION OF THE PREFERRED EMBODIMENTS

Although the following provides a detailed explanation of the present invention based on embodiments thereof, the present invention is not limited to the following embodiments.

Example 1

Figure 1:
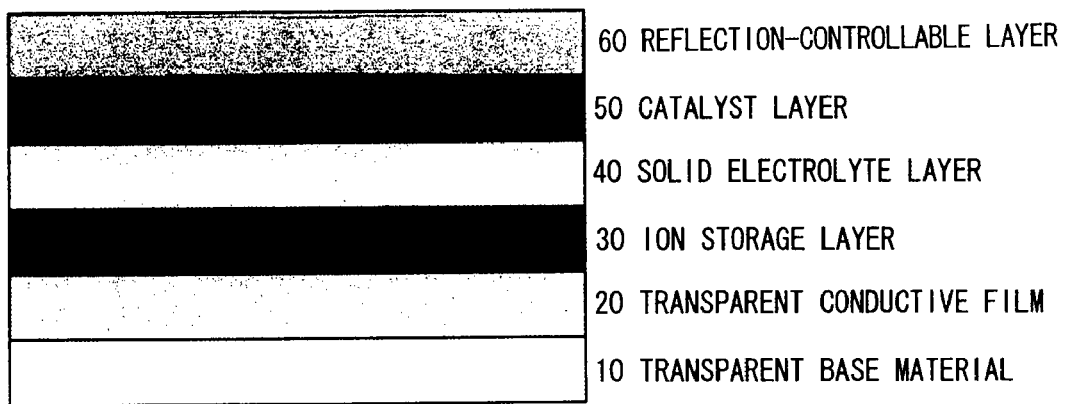
FIG. 1 shows a schematic drawing of an example of a device of the present invention (all-solid-state reflection-controllable electrochromic device 1)
Figure 2:
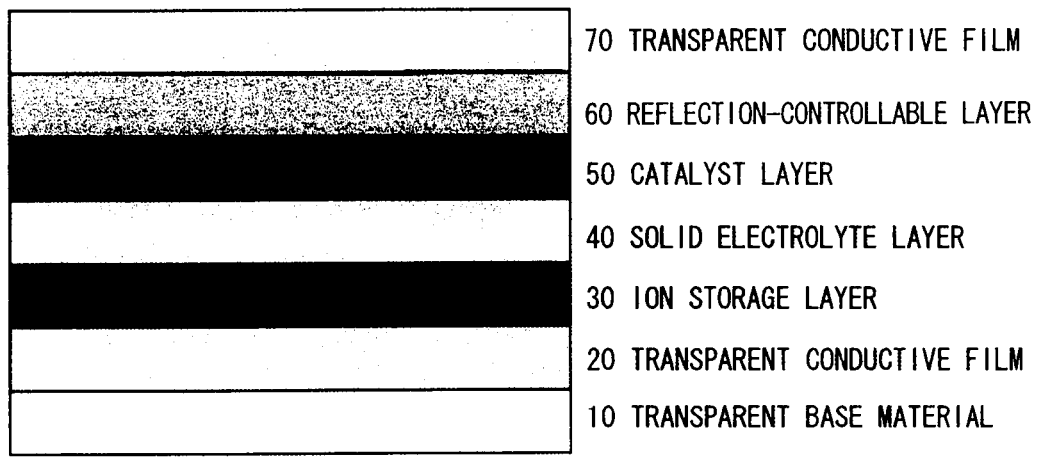
FIG. 2 shows a schematic drawing of another example of a device of the present invention (all-solid-state reflection-controllable electrochromic device 2)
Figure 3:
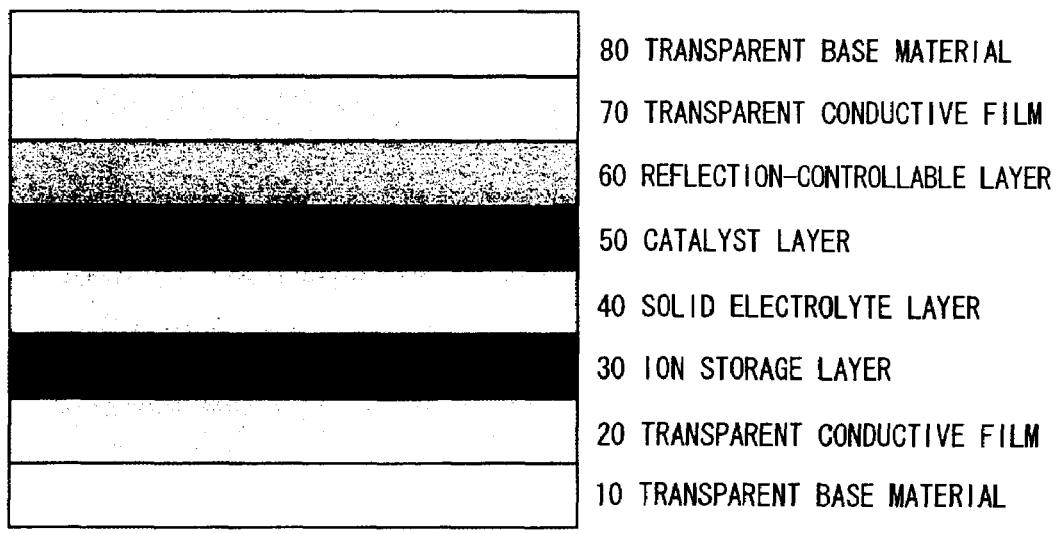
FIG. 3 shows a schematic drawing of another example of a device of the present invention (all-solid-state reflection-controllable electrochromic device 3)
Figure 4:
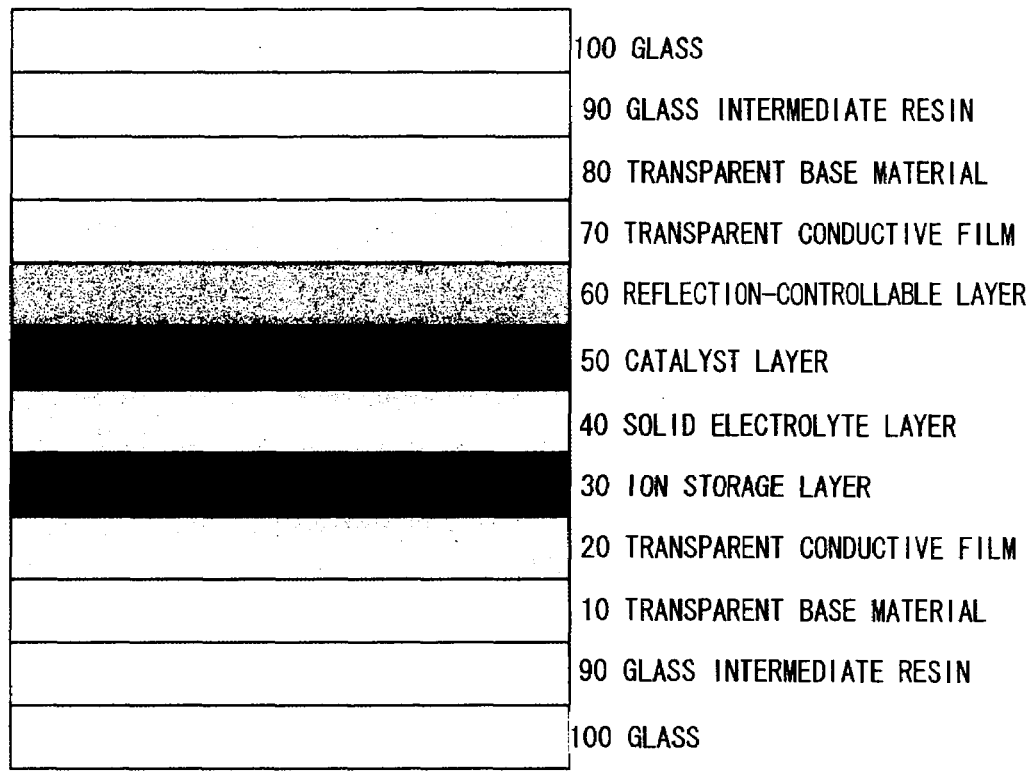
FIG. 4 shows a schematic drawing of another example of a device of the present invention (all-solid-state reflection-controllable electrochromic device 4)
Figure 5:
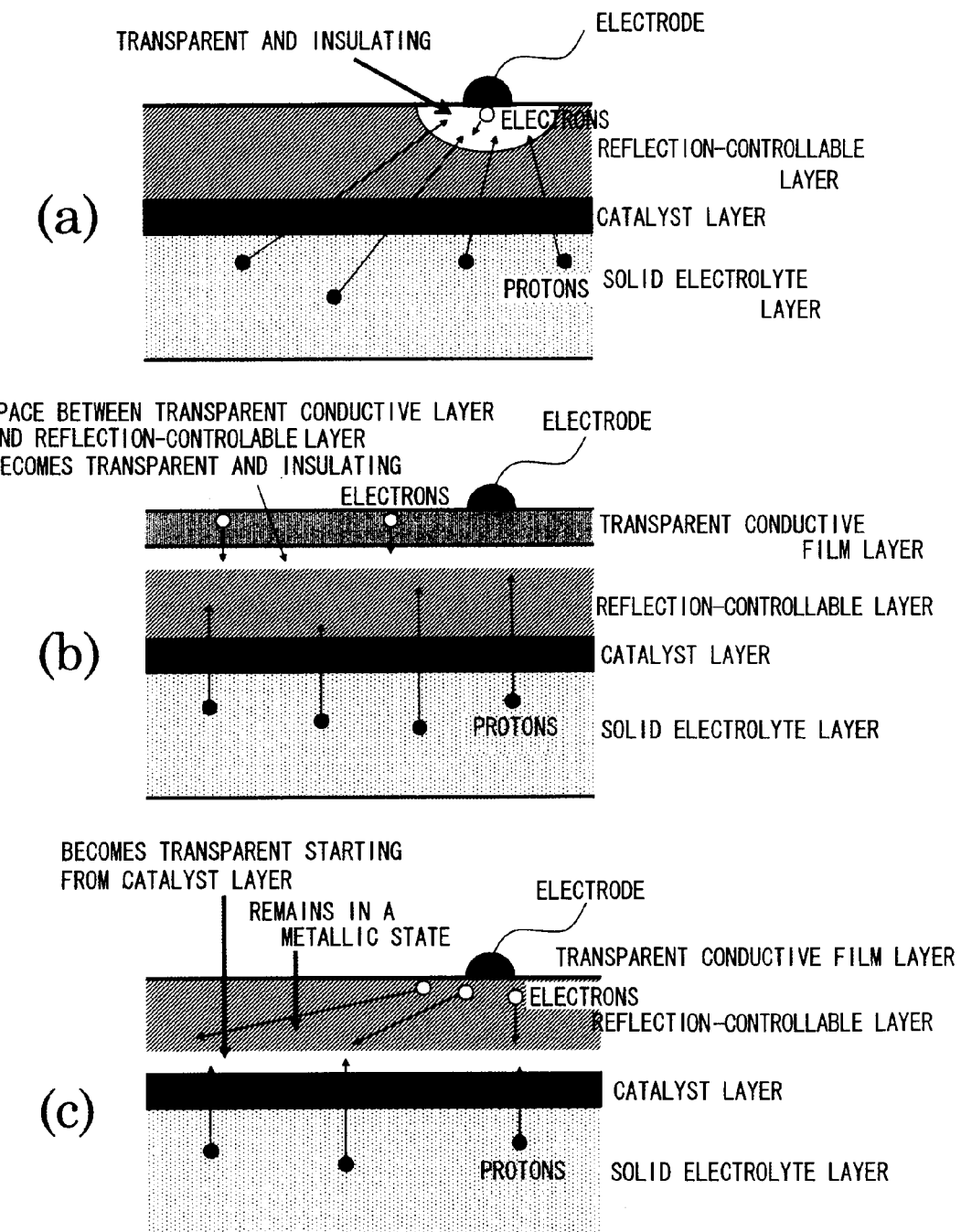
FIG. 5 shows schematic drawings of switching.

First, an explanation of a first layer structure of the present invention is provided with reference to FIG. 1. In the present example, the all-solid-state reflection-controllable electrochromic device shown in FIG. 1 was used. Although the following provides an explanation of a process procedure with respect to an embodiment of a production process, the technical scope of the present invention is not limited to the following procedure. An electrochromic device can be produced by, for example, forming a transparent conductive film, a reflection-controllable layer and a catalyst layer on a first base material, followed by forming a transparent conductive film, an ion storage layer and a solid electrolyte layer on a second base material, and then laminating the base materials.

A glass plate having a surface resistance of 10Ω/□ and thickness of 1 mm and coated with a transparent conductive film in the form of tin-doped indium oxide was used as a substrate. After rinsing, the substrate was vacuum degassed by placing in a vacuum system. A tungsten oxide thin film was deposited on the substrate with a magnetron sputtering system. Deposition was carried out using reactive DC sputtering in which a metal tungsten target was sputtered in a mixed atmosphere of argon, oxygen and hydrogen.

The mixed atmosphere was controlled by controlling the flow rates of argon gas, oxygen gas and hydrogen gas. The ratio of the flow rates of the argon gas, oxygen gas and hydrogen gas was 10:2:5, and sputtering was carried out by DC sputtering at a pressure of 1 Pa inside the vacuum tank by applying power of 60 W to the tungsten. The thickness of the resulting tungsten oxide thin film was about 1000 nm. The resulting tungsten oxide thin film had a bronzed, deep blue color due to the effects of introducing hydrogen.

A tantalum oxide thin film was produced on the tungsten oxide thin film by reactive DC sputtering in the same manner as the tungsten oxide thin film. Deposition was carried out by sputtering a metal tantalum target in a mixed atmosphere of argon and oxygen to produce a thin film. The mixed atmosphere was controlled by controlling the flow rates of the argon gas and oxygen gas. The ratio of the flow rates of the oxygen gas and argon gas was 3:1, and sputtering was carried out by DC sputtering at a pressure of 0.7 Pa inside the vacuum tank by applying power of 65 W to the tantalum.

The thickness of the resulting tantalum oxide thin film was about 400 nm, and the density was about 3.8 g/cm$^3$. The color of the tantalum oxide film did not change in color and remained deep blue even after being deposited on the tungsten oxide thin film.

A palladium catalyst layer and a magnesium-nickel alloy thin film reflection-controllable layer were deposited on the surface of the two-layer tantalum oxide/tungsten oxide film with a three-way magnetron sputtering system. Targets consisting of magnesium metal, nickel metal and palladium metal, respectively, were placed on the three sputtering guns. In carrying out deposition, the palladium was sputtered first followed by depositing a catalyst layer in the form of a palladium thin film at a thickness of about 4 nm.

The pressure of the argon gas during sputtering was 0.8 Pa, and sputtering was carried by DC sputtering by applying a power of 14 W to the palladium. Subsequently, magnesium-nickel alloy thin film was deposited at a thickness of about 40 nm by applying a power of 30 W to the magnesium and power of 16 W to the nickel. The composition of the magnesium and nickel at this time was approximately $MgNi_{0.25}$. Moreover, an indium electrode was then formed on the magnesium thin film. This switching device is initially in a mirrored state.

Example 2

Figure 6:
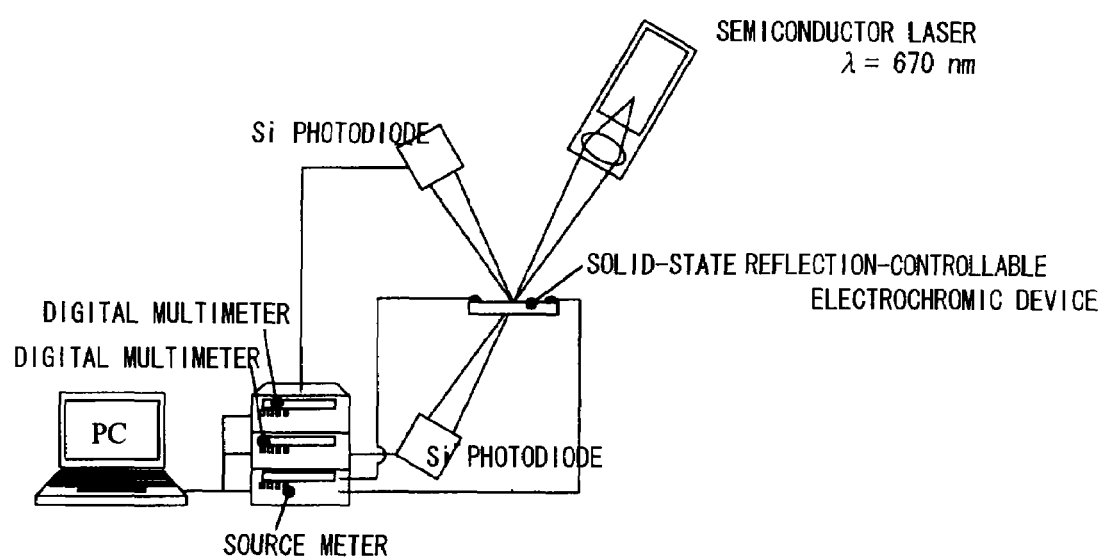
FIG. 6 shows a schematic drawing of a system for evaluating the characteristics of an all-solid-state reflection-controllable electrochromic device; and, FIG. 7 shows the switching characteristics of an all-solid-state reflection-controllable electrochromic device (changes in optical transmittance and optical reflectance at a wavelength of 670 nm).

The resulting multilayer film was mounted in an evaluation system as shown in FIG. 6 to investigate the optical switching characteristics thereof. A voltage of ±5 V was applied between the tin-doped indium oxide and the indium, and the change in optical transmissivity was measured with a measurement system combining a semiconductor laser having a wavelength of 670 nm and a silicon photodiode.

Since the reflection-controllable layer has a shiny metallic surface, the as-deposited multilayer film reflects light well (optical reflectance: up to 28%), and since the ion storage layer in the form of a tungsten oxide thin film has a deep blue color, the transmissivity is extremely low (optical transmittance: up to 0.1%). When a −5 V voltage was applied to the indium electrode side of this multilayer film, the protons in the tungsten oxide thin film are released due to electric field effects, are transferred through the solid electrolyte layer, and then are introduced into the magnesium-nickel alloy thin film.

Figure 7:
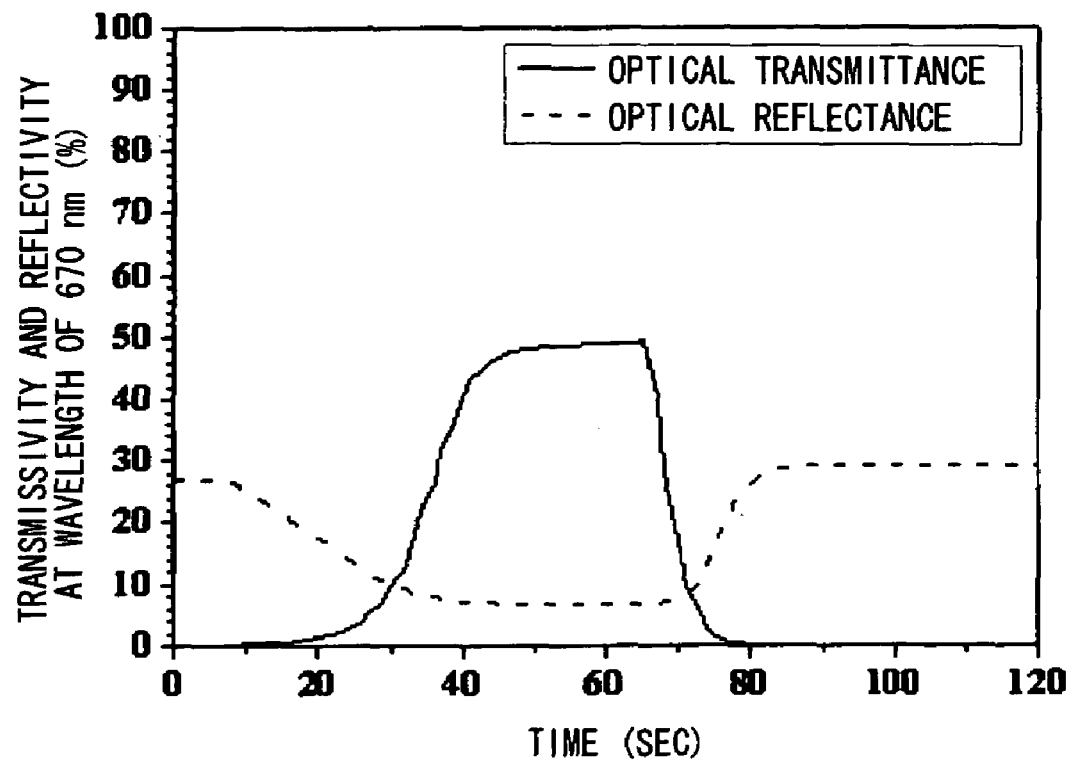

As a result, the tungsten oxide thin film becomes transparent, and hydrogenation occurs in the magnesium-nickel alloy thin film, thereby causing it to become transparent as well (optical reflectance: up to 6%, optical transmittance: up to 48%). The time-based changes in optical transmittance at this time are shown in FIG. 7. In FIG. 7, this change took place in roughly only 40 seconds, indicating an extremely fast response. Conversely, when a +5 V voltage was applied to the indium electrode side, transmittance decreased in about 15 seconds and the film returned to a mirror state. As a result, this device was determined to be able to be reversibly changed between a mirrored state and transparent state by changing the polarity of the applied voltage.

As has been described in detail thus far, the present invention relates to an all-solid-state reflection-controllable electrochromic device using a magnesium-nickel alloy thin film material having superior reflection-controllable characteristics, and is able to provide an all-solid-state reflection-controllable electrochromic device and reflection-controllable member incorporating said device capable of controlling the amount of transmitted radiant energy of sunlight as desired and maintaining a comfortable interior space.

What is claimed is:

1. An all-solid-state reflection-controllable electrochromic device, comprising a reflection-controllable device having a multilayer thin film formed on a transparent base material, the multilayer thin film comprising, at least a transparent conductive film layer, an ion storage layer, a solid electrolyte layer, a catalyst layer and a reflection-controllable layer comprising a magnesium-nickel based alloy thin film formed on the base material.

2. The all-solid-state reflection-controllable electrochromic device according to claim 1, wherein a reflection-controllable action is exhibited by applying a voltage and/or applying a current between the transparent conductive film layer and the reflection-controllable layer.

3. The all-solid-state reflection-controllable electrochromic device according to claim 1, wherein a transition metal oxide thin film is formed as the ion storage layer on the transparent base material coated with a transparent conductive film.

4. The all-solid-stage reflection-controllable electrochromic device according to claim 1, wherein a transparent oxide thin film is formed on the ion storage layer as the solid electrolyte layer.

5. The all-solid-state reflection-controllable electrochromic device according to claim 4, wherein the transparent oxide comprises tantalum oxide ($Ta_2O_5$).

6. The all-solid-state reflection-controllable electrochromic device according to claim 5, wherein the density of the solid electrolyte layer is 2.8 to 4.3 $g/cm^3$.

7. The all-solid-state reflection-controllable electrochromic device according to claim 1, wherein a layer comprising palladium, gold, silver or an alloy thereof is formed on the solid electrolyte layer as the catalyst layer.

8. The all-solid-state reflection-controllable electrochromic device according to claim 1, wherein the magnesium-nickel based alloy thin film is formed on the catalyst layer as the reflection-controllable layer.

9. The all-solid-state reflection-controllable electrochromic device according to claim 1, wherein the magnesium-nickel based alloy is $MgNi_x$ (where $0.1 \leq x \leq 0.5$).

10. The all-solid-state reflection-controllable electrochromic device according to claim 1, wherein the ion storage layer or the reflection-controllable layer is hydrogenated during production process thereof.

11. The all-solid-state reflection-controllable electrochromic device according to claim 1, wherein the device has the transparent conductive film layer between the transparent base material and the ion storage layer.

12. The all-solid-state reflection-controllable electrochromic device according to claim 1, wherein the device has the transparent conductive film layer to the outside of the reflection-controllable layer as an arbitrary configuration thereof.

13. The all-solid-state reflection-controllable electrochromic device according to claim 1, wherein the surface resistance of the transparent conductive film layer is 100Ω/□ or less.

14. The all-solid-state reflection-controllable electrochromic device according to claim 1, wherein the transparent conductive film layer comprises at least one type of metal thin film, oxide or organic compound having light transmission of 70% or more.

15. A reflection-controllable member, comprising the all-solid-state reflection-controllable electrochromic device according to claim 1 incorporated therein.

16. The reflection-controllable member according to claim 15, wherein the reflection-controllable member is glass.

* * * * *